G. W. Gregory,
Grapple.
No. 2,939 Reissued May 19, 1868.
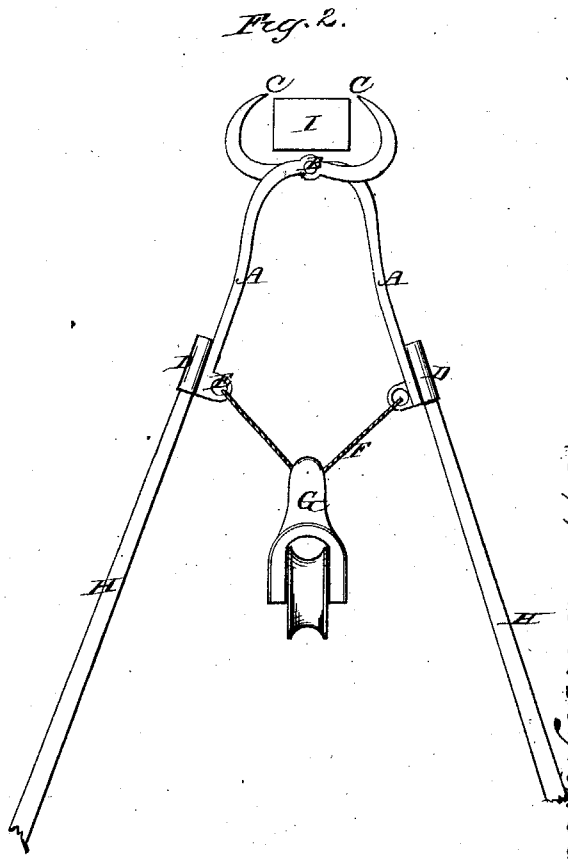
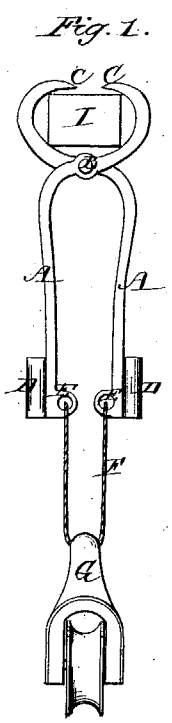
Witnesses
Thos Hamilton
John D Bloor
Inventor
Geo W. Gregory
N. PETERS, PHOTO-LITHOGRAPHER, WASHINGTON, D. C.

UNITED STATES PATENT OFFICE.

GEORGE W. GREGORY, OF WATERTOWN, NEW YORK.

PULLEY ATTACHMENT FOR RAISING WEIGHTS.

Specification forming part of Letters Patent No. 57,125, dated August 14, 1866; antedated February 14, 1866; Reissue No. 2,784, dated October 22, 1867; Reissue No. 2,939, dated May 19, 1868.

*To all whom it may concern:*

Be it known that I, GEO. W. GREGORY, of Watertown, Jefferson county, and State of New York, have invented certain new and useful Improvements in the Manner of Adjusting Pulleys for Hay-Forks and other Purposes to Beams or Rafters; and I do hereby declare that the following is a full, clear, and exact description thereof, reference being had to the annexed drawings, and to the letters of reference marked thereon, like letters indicating like parts, and in which—

Figure 1 is a perspective view of my grapple or adjustable pulley-support hooked on the beam and supporting a pulley, and Fig. 3 is a perspective view of the grapple or support open and about to be hooked to the beam.

In operating hay-forks it is necessary that one of the pulleys shall hang over that portion of the bay where the hay is to be deposited, and in large barns it is necessary to change the position of the pulleys from time to time, in order to distribute the hay in all parts of the bay. Heretofore the pulley has either been supported by a screw-hook screwed into the beam or rafter or by a cord or chain passed around the beam or rafter, and in both cases the operator, before using the fork, has been obliged to ascend in some manner into the peak of the barn, and with a bit bore a hole for the hook, and screw the hook therein, or pass a chain or rope around the beam or rafter, to which hook, chain, or rope the pulley was then attached. The ascent must be made as often as it is necessary to change the pulley, and is often, in high barns, quite dangerous, and always inconvenient.

My invention therefore consists in providing a pulley-support with sockets, or equivalents, to receive or operate in connection with a pole or poles, so that the pulley-support may be changed from place to place, and, also, in connection with a support provided with sockets, or equivalents, as set forth, means for supporting the pulley, the great aim and object of my invention being to operate the pulley-support by means of a pole or poles, thereby obviating the necessity of ascending to the vicinity of the beam supporting the pulley to adjust it, as heretofore done, thereby saving time and avoiding much trouble and danger.

In order to enable others to make and use my invention, I will proceed to describe its construction and operation.

The adjustable pulley-support is composed of two bent arms, A A, pivoted together at B, and having the part C C curved and pointed sufficiently to surround a beam or rafter or to fasten into its sides. The part marked I is intended to represent a beam. The arms A A are provided with suitable sockets and rings, D and E, or equivalents, the former to receive poles H, by which the pulley-support is operated and changed from place to place, as desired, and the latter to receive the cord or rope F, that supports the pulley G. The chain or cord F is first passed through the eye of the pulley. The chain is then fastened to eyes E, and pole H is inserted in socket D, or its equivalent, and the pulley-support, with the pulley attached, is raised by said pole into the peak and clasped to rafter or beam wherever desired. The pole or poles may then be removed. The weight of the pulley and the weight of the fork and hay on the cord passing over the pulley tend to keep the pulley-support close to the beam.

I am aware that grapples have been constructed similar in their general appearance to the one shown by me; but none, so far as I am aware, have been provided with tubes or sockets, or their equivalents, and raised and adjusted by a pole or poles. I do not therefore claim a grapple constructed as herein described; neither do I desire to confine myself to the precise construction herein described; but

What I claim, and desire to secure by Letters Patent, is—

1. An adjustable pulley-support having one or more sockets, or their equivalents, by and through which the pulley-support may be operated and changed from place to place, substantially as described.

2. An adjustable pulley-support provided with sockets or equivalents, and with means for supporting the pulley, substantially as described.

3. The combination of an adjusting-pole with a pulley-support having sockets or equivalents, substantially as and for the purpose set forth.

GEO. W. GREGORY.

Witnesses:
JOHN CASHMAN,
JOHN LEWIS.